Oct. 16, 1928.

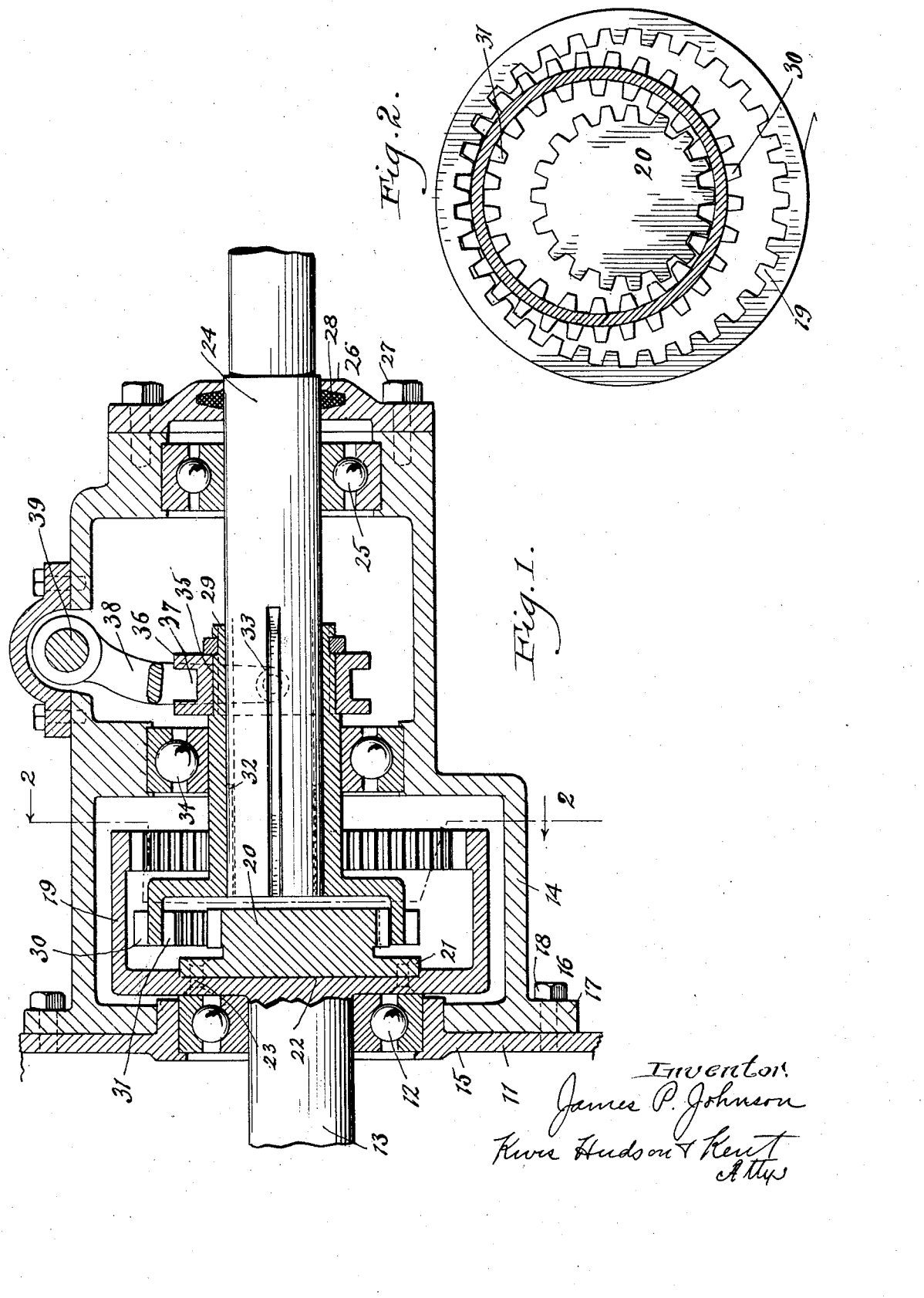

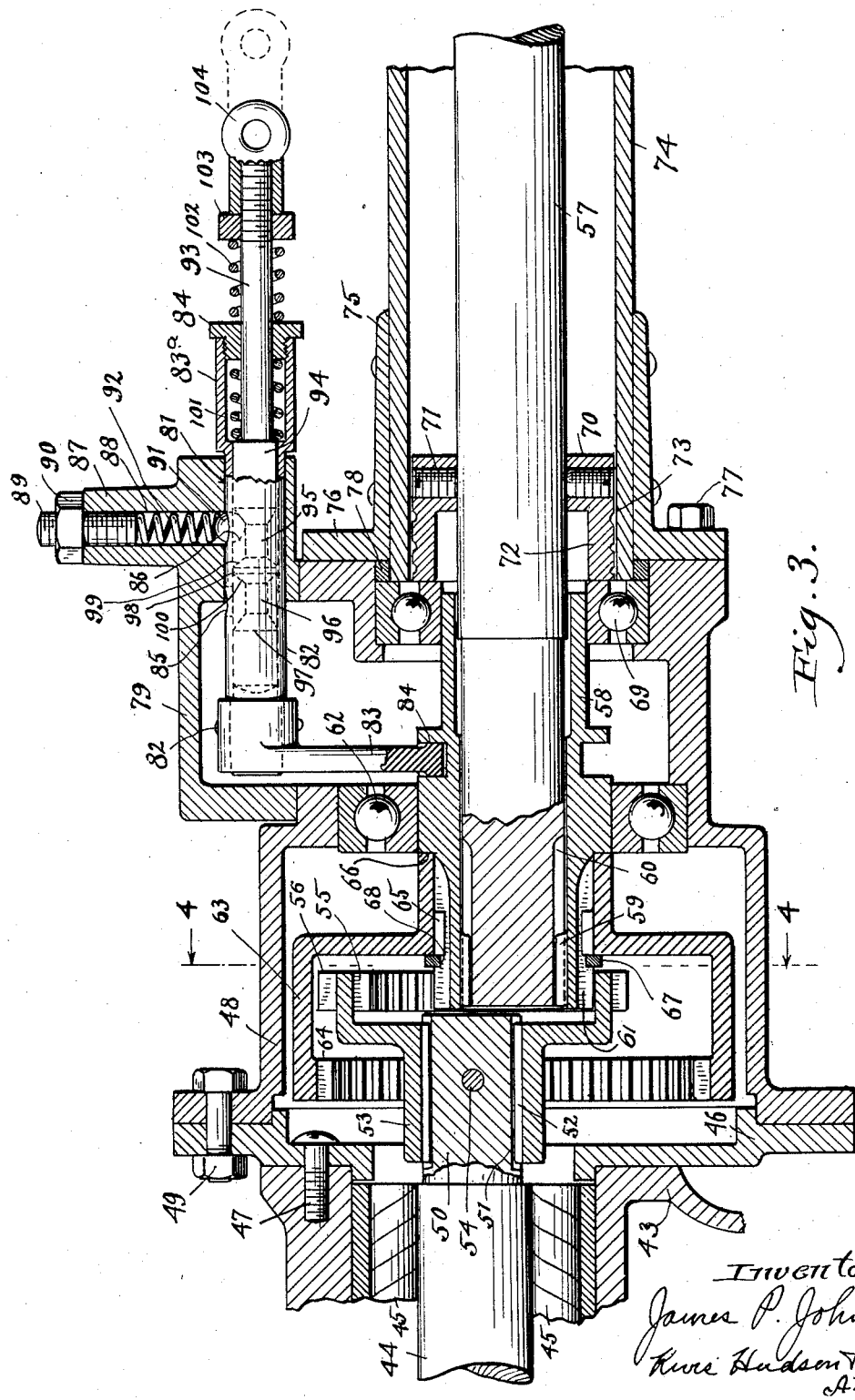

J. P. JOHNSON 1,687,567

VARIABLE SPEED GEARING

Filed Feb. 25, 1927  4 Sheets-Sheet 3

Inventor:
James P. Johnson
Kwis Hudson & Kent
Attys

Oct. 16, 1928.  1,687,567
J. P. JOHNSON
VARIABLE SPEED GEARING
Filed Feb. 25, 1927  4 Sheets-Sheet 4
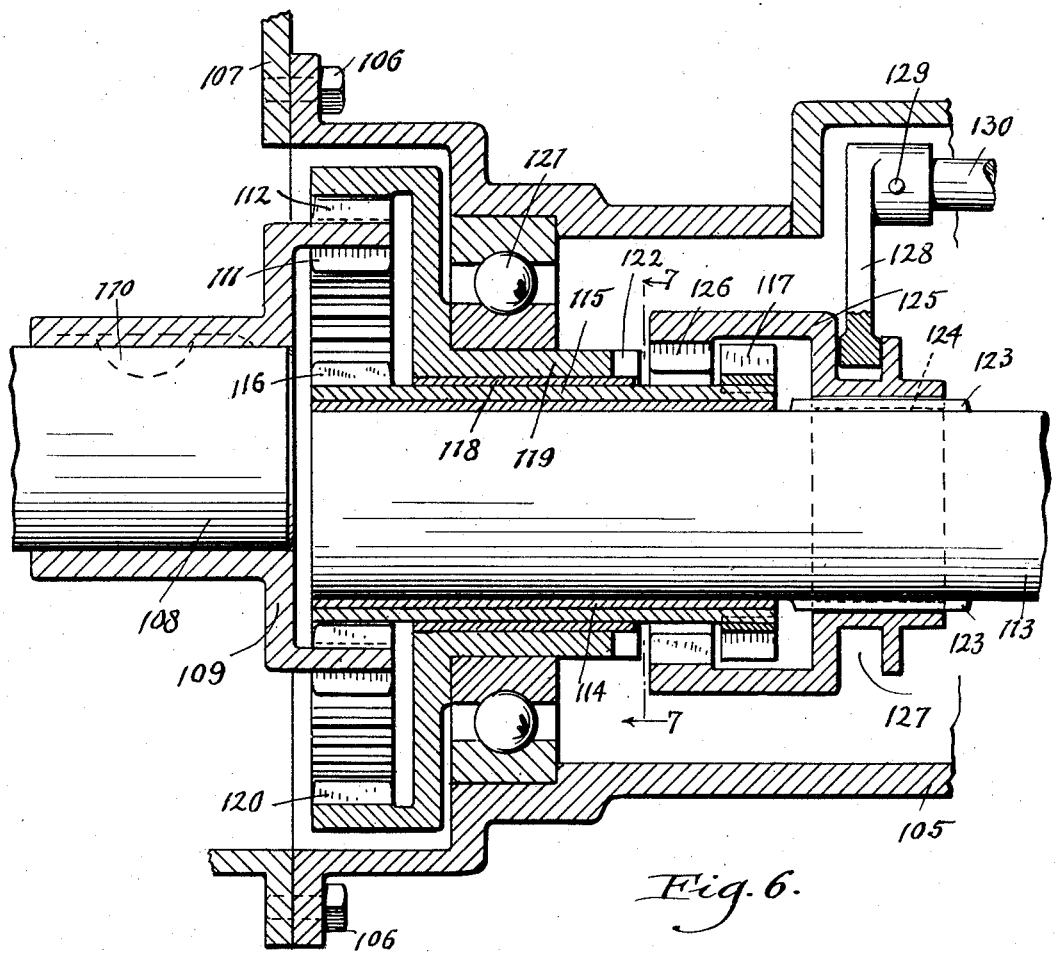
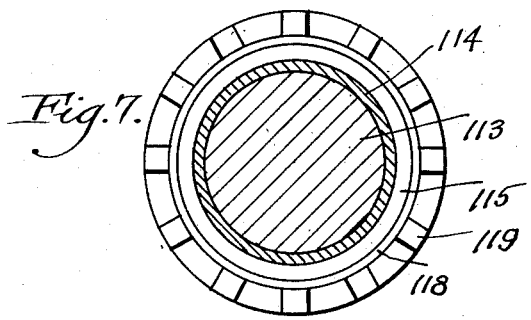
Inventor:
James P. Johnson
Kurs Hudson & Kent
Attys Patented Oct. 16, 1928.

1,687,567

UNITED STATES PATENT OFFICE.

JAMES P. JOHNSON, OF CLEVELAND HEIGHTS, OHIO, ASSIGNOR TO THE J. P. JOHNSON ENGINEERING COMPANY, OF CLEVELAND, OHIO, A CORPORATION OF OHIO.

VARIABLE-SPEED GEARING.

Application filed February 25, 1927. Serial No. 170,785.

This invention relates to gearing and more particularly to supplemental gearing to be used in connection with the usual transmission of a motor vehicle and can be built as a part of the transmission or can be installed as an auxiliary unit.

The primary object of the invention is to provide what is known as a two quiet high speed gearing adapted for use with either pleasure vehicles or trucks and to construct the device so that the same will be inexpensive to manufacture, light in weight, and will have a minimum number of working parts.

The necessity for a two quiet high speed transmission is apparent to those at present skilled in the art as it provides a means for fast country driving at a reduced engine speed and still provides a quiet and desirable speed for city driving where greater power is required for a quick pick-up, and for hill climbing.

The results from the present invention are attributable to the arrangement of the mechanism and in employing internal gears in mesh with external gears which, because of the great number of teeth in mesh at one time results in an exceptionally quiet drive. Furthermore, the use of an internal and external meshing gear considerably prolongs the life thereof and provides gearing of considerably more strength.

A further object of the invention when installed on vehicles where the braking is accomplished by engagement with the drive shaft, is to provide positive means for shifting from one gear ratio to another gear ratio so that the probability of being caught in neutral position and thereby having no braking action is substantially eliminated.

With the objects above indicated and other objects hereinafter explained in view, the invention consists in the construction and combination of elements hereinafter described and claimed.

Referring to the drawings:

Fig. 1 is a longitudinal sectional view of a device embodying the invention, the type herein shown being applicable to motor vehicles of the shifting gear type.

Fig. 2 is a vertical cross sectional view taken on line 2—2 of Fig. 1 and showing the relative positions of the gears.

Fig. 3 is a longitudinal sectional view of a device embodying the invention but modified for use in connection with motor vehicles employing the planetary type of transmission.

Fig. 6 is a longitudinal sectional view of a device embodying the present invention but modified to the extent that the gears are constantly in mesh and the desired driving gear ratio is obtained by the shifting of a clutch member.

Fig. 7 is a vertical cross sectional view taken on line 7—7 of Fig. 6.

Figure 4:
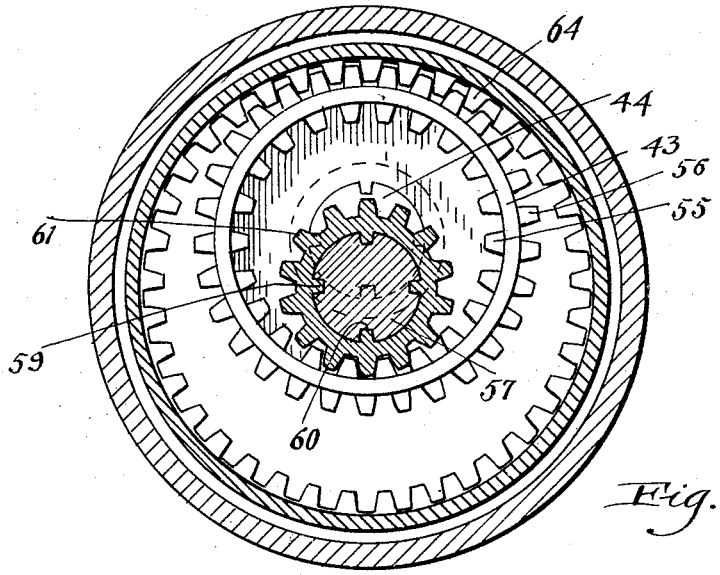
Fig. 4 is a vertical cross sectional view taken on line 4—4 of Fig. 3 showing the relative position of the gears.

In the drawings, referring particularly to Figs. 1 and 2, I have illustrated a type of supplemental gearing adapted for use in connection with motor vehicles employing the gear shift type of transmission and connected to the transmission housing 11. This housing supports at its rear end the usual ball bearings 12 in which is rotatably mounted the drive shaft 13. The mechanism making up the device is enclosed in a housing 14 which at one end is provided with an inwardly extending flange 15 supported upon the transmission housing 11 and also with an outwardly extending flange 16 having a plurality of openings 17 adapted to receive cap screws or bolts 18 which secure the respective housings together.

The rear end of the drive shaft 13 has formed integrally therewith an internal gear 19, although it should be understood that this gear may be formed separately and secured to the drive shaft 13 in any suitable manner.

An external gear 20 has an outwardly extending flange 21 which is secured, concentrically in a recess 2 provided in the rear surface of the gear 19, by countersunk rivets 23 although any other suitable means may be employed.

A driven shaft 24 extends centrally of the housing 14 and its inner end terminates adjacent the gear 20 while the opposite end is suitably connected to the differential or rear axle, which is not here shown. This driven shaft 24 is rotatably mounted in ball bearings 25 which in turn are suitably supported in the rear end of the housing 14. The housing 14 at its rear end is provided with a cover 26 through which the driven shaft 24 extends and is detachably connected thereto by cap screws or bolts 27. The cover 26 is provided with the usual packing 28 encircling the driven shaft 24 to prevent the escape of lubricant contained within the housing 14. It should be here noted that the drive shaft 13 and the driven shaft 24 are positioned off center with respect to each other, and this arrangement constitutes one of the important features of the present invention.

The forward end of the driven shaft 24 within the housing 14 has mounted thereon a longitudinally slidable sleeve 29, the forward end of which is provided with external gear teeth 30 and internal gear teeth 31, the latter being adapted to mesh with the external gear 20 when the sleeve 29 is in its foremost position, and the external teeth 30 being adapted to mesh with the internal gear 19 when the sleeve 29 is in its rearmost position. This sleeve 29 is prevented from relative rotation about the driven shaft 24 by internal splines 32 adapted to engage and slide within cooperating grooves 33 provided upon the inner end of the driven shaft 24. This sleeve is, therefore, prevented from independent rotation about the driven shaft 24 but at the same time permitted to move longitudinally thereof to effect the changing of the gear ratios. Care should be taken in positioning the internal gear 19 from the external gear 20 so that the distance therebetween is slightly greater than the width of the internal and external gear teeth 30 and 31, thereby providing a neutral position so that the internal gear teeth 31 have been completely disengaged from the external gear 20 before the external gear 30 engages or meshes with the internal gear 19.

The driven shaft 24 is supported at its forward end by ball bearings 34 which engage with the inner portion of the ball race slidably mounted upon the sleeve 29 while the outer portion of the ball race is secured in the housing 14.

To facilitate the moving or shifting of the sleeve 29 along the driven shaft 24 to change to the desired gear ratio, the sleeve is provided with a circumferentially extending groove 35 in which is mounted to rotate therewith a cylindrical member 36 provided in its outer surface with a circumferentially extending groove 37. An arm 38 is pivoted at 39 to the interior of the housing 14 and the free end thereof freely engages the groove 37. This arm 38 is suitably connected to an operating or shifting lever not shown, and movement of the shifting lever reciprocates the arm 38, resulting in shifting the sleeve 29 to obtain the desired gear ratio or speed.

As heretofore indicated, the supplemental gearing may be either built into the transmission as an integral part thereof or may be installed as an independent unit, and in either instance the shifting of the sleeve 29 may be accomplished by an independent shift lever conveniently located near the driver of the vehicle, or may be shifted by suitable direct connection with the customary gear shift lever. If an independent shifting lever is employed on motor vehicles of the gear shift type, the result would be, where there ordinarily were three forward speeds and one reverse speed, a step up of speed ratios to six forward speeds and two reverse. However, when the sleeve is shifted by means of the transmission gear shifting lever, which arrangement is preferable, the gear ratios of each speed have been increased, resulting in more power and acceleration but less speed in the first three gear ratios, but a decrease in gear ratio for the overdrive or fourth speed which results in more speed at a lower R. P. M. of the engine producing a speed or gear ratio exceptionally desirable for country driving.

In the present arrangement, it is to be noted that there is no so-called direct drive, and as employed in most types of overdrives, this results from positioning the drive shaft 13 connected to the engine off center with respect to the driven shaft 24 connected to the rear wheels or differential.

The arrangement of the parts illustrated in Fig. 1 shows the relative position of the gears when the underdrive is employed. It will be here noted that the gear 20 secured to the drive shaft 13 is in engagement with the internal teeth 31 of the slidable sleeve 29 and the driven shaft 24 is thereby rotated which transmits power to the rear wheels. The ratio of the teeth of these gears 20 and 31 is determined so as to provide the desired speed ratio for the underdrive and will depend entirely upon the speed ratio of the rear axle. This underdrive is exceptionally desirable for use in the city or in congested districts where power and quick acceleration is required.

When it is desired to employ the quiet speed overdrive the sleeve 29 is moved rearwardly by means of the shifting lever until the external gear teeth 30 are in mesh with the internal gear 19, the internal gear teeth 31 having been disengaged from the external gear 20 during sliding movement of the sleeve 29. It will be noted that the gear ratio has been materially increased, affording greater speed for the motor vehicle at a considerably reduced engine speed, the drive now being established through the internal gear 19 on the drive shaft 13 in mesh with the external gear teeth 30 on the sleeve 29, thereby transmitting power through the overdrive to the rear axle of the motor vehicle.

Figure 5:
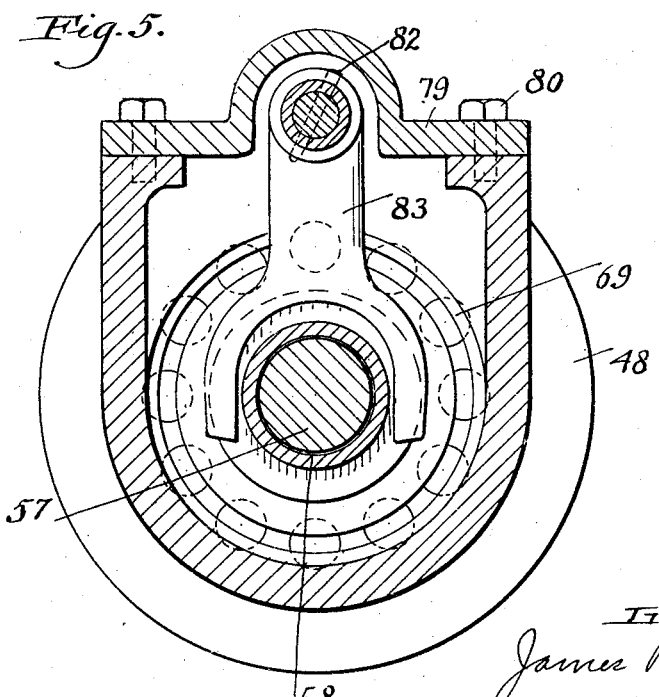
Fig. 5 is a vertical cross sectional view taken on the line 5—5 of Fig. 3, showing the shifting fork.

Referring particularly to Figs. 3, 4 and 5, I have herein illustrated a two quiet high speed gearing embodying the same invention as heretofore described, but the device has been modified to adapt it for use in connection with the driving mechanism of motor vehicles employing the planetary type of transmission or motor vehicles in which the braking action is accomplished by engagement with the drive shaft.

In the drawings, the usual axle or differential housing is indicated by 43 and the driven shaft 44 extends centrally thereof and is rotatably mounted in roller bearings 45 secured within the housing. The usual circular plate 46 is secured by cap screws or bolts 47 to the housing 43, which plate ordinarily receives one end of the torque tube but in the present instance the gearing housing 48 is secured by bolts 49 to the plate 46.

The driven shaft 44 has a reduced end portion 50 extending within the housing 48 which is provided with outwardly extending splines 51 adapted to engage with cooperating inwardly extending splines 52 formed upon the gear 53, the latter being prevented from longitudinal movement by a transverse pin 54. This gear 53 is provided with internal gear teeth 55 and external gear teeth 56 for a purpose to be later described.

A drive shaft 57 extending within the housing 48, is positioned off center with respect to the driven shaft 44 and terminates adjacent thereto. The rearward end of the drive shaft 57 carries a longitudinally sliding sleeve 58 which is provided upon its inner rearward portion with a plurality of depending splines 59 which cooperatively engage with longitudinally extending grooves 60 provided in the outer surface of the shaft which prevents relative rotation therebetween. The rearward end of the sleeve 58 is further provided with external gear teeth 61 which are adapted to mesh with the internal gear teeth 55 on the gear 53 when the sleeve is in its rearward position, and, when in such engagement, the motor vehicle is driven through its underdrive. The sleeve 58 is rotatably supported near its mid-portion by ball bearings 62 which are mounted upon the inner portion of the housing 48. Upon the sleeve 58 between the bearings 62 and the gear teeth 61 is mounted a gear 63 provided with internal gear teeth 64, and this gear is prevented from rotation about the sleeve 58 by a plurality of depending splines 65 which cooperatively engage with continued portions of the teeth 61. The gear 63 is adapted to engage with an annular shoulder 66 formed upon the sleeve 58 and is maintained in engagement therewith by a split ring 67 engaging the opposite portion of the gear 63 and positioned within a circumferential groove 68 adjacent the gear teeth 61. The forward portion of the sleeve 58 is slidably supported in ball bearings 69 which in turn are securely mounted upon the inner portion of the housing 48.

To prevent the possibility of engagement between the ends of the driven shaft 44 and the drive shaft 57, a cylindrical collar 70 is secured to the drive shaft 57 by a plurality of stud bolts 71 and the collar has an integral rearwardly extending horizontal flange 72, the end of which abuts with the race of the ball bearings 69. Oil grooves 73 are provided to prevent oil leakage between the flange 72 and the tubular torque tube 74 which surrounds the drive shaft 57. This tubular member 74 is secured at its rearward end to the inner surface of a tubular extension 75 by rivets or other suitable means, the extension being formed integral with an annular flange 76 secured by bolts 77 to the housing 48. A suitable packing ring 78 is positioned adjacent the flange 76 to prevent the escape of the lubricant within the housing.

In the mechanism herein described it will be noted that there is a neutral position of the shifting gear 63 and when in this neutral position there is no driving connection between the drive shaft 57 and driven shaft 44. In motor vehicles wherein the braking action is obtained by engagement with the drive shaft such a condition would be undesirable, due to the fact that while this gear 63 would be in neutral position there would be no driving connection between the drive shaft and the driven shaft and actuation of the braking mechanism would not stop the motor vehicle. In order to overcome this objection a mechanism is employed whereby this sliding gear 63 and the gear 61 is assisted past the neutral position so that the danger of being caught in neutral position is eliminated.

The preferred arrangement consists of a cover 79 which is secured by means of bolts 80 to the upper portion of the housing 48 as clearly shown in Fig. 5. This cover 79 is provided with a horizontally disposed bore 81 in which is slidably mounted a tubular member 82. One end of the tubular member extends within the cover 79 and is pinned at 82 or otherwise suitably secured to a shifting fork 83. The bifurcated end of the shifting fork 83 extends downwardly into engagement with a circumferential groove 84 formed upon the sleeve 58. It will, therefore, be seen that in order to shift the sleeve 58 to engage the teeth thereon with either the external gear teeth 56 or the internal gear teeth 55 the tubular member 82 is moved longitudinally. The outer end of the tubular member 82 is provided with a portion 83 of enlarged diameter, the open end of which is interiorly screw-threaded to receive an adjusting nut 84. The tubular member 82 is provided with a pair of openings 85 and 86 spaced a distance apart equivalent to the longitudinal movement of the sleeve 58 and these openings are provided for the purpose of maintaining the gears in driving engagement. The cover 79 is provided with an extension 87 through which extends a centrally disposed bore 88, the outer portion of the bore being screw-threaded to receive a stud bolt 89 and a lock nut 90 so that the stud bolt may be adjusted within the bore 88. A ball 91 engages the opening 86 in the tubular member 82 when the external teeth 61 upon the sleeve 58 are in mesh with the internal teeth 55 on the gear 53 and this ball is maintained in engagement with the opening by a spring 92 disposed within the bore 88.

Extending through the adjusting nut 84 and centrally within the tubular member 82 is a rod 93. This rod is provided with a guide portion 94 adapted to slide within the tubular member 82. The rod 93 beyond the bearing portion 94 is provided with portions 95 and 96 of reduced diameter, the diameter being such that when the ball 91 engages the periphery thereof the horizontal axis of the ball is below the outer periphery of the tubular member 82 and thereby prevented from becoming accidentally disengaged from the opening 86. The inner end of the rod 93 adjacent the reduced portion 96 is provided with a flared end 97 and interposed between the reduced portions 95 and 96 but formed integrally therewith is an enlarged portion 98 having inclined cam surfaces 99 and 100 which are adapted upon longitudinal movement of the rod 93 to engage the ball 91 and move the same upwardly out of engagement with the openings 85 or 86, depending upon the direction of movement of the rod. Surrounding the rod 93 and disposed within the enlarged extension 83 of the tubular member 82 is a spring 101 having one end in engagement with the bearing portion 94 while the opposite end engages the adjusting nut 84. The movement of this adjusting nut in one direction or the other regulates the tension of this spring 101. A spring 102 surrounds the rod 93 and has one end engaging the opposite side of the adjusting nut 84 while the opposite end abuts a collar 103 screw-threaded upon the end of the rod. An eye member 104 is screw-threaded onto the end of the rod 93 and adapted to be connected to a suitable shifting connection. It is desirable that the tension upon the springs 101 and 102 be the same and these springs are adjusted by means of the adjusting nut 84 and the adjusting nut 103.

It will be seen, referring particularly to Fig. 3, that if it is desired to shift from the underdrive in which the gear teeth 61 and 55 are in mesh to the overdrive in which the gear teeth 56 and 64 are in mesh, the rod 93 should be moved forwardly. As the rod 93 is moved forwardly the spring 101 is compressed and the inclined cam surface 99 engages the ball 91, moving the same upwardly against the tension of the spring 92. Just before the ball 91 is disengaged from the opening 86 the gears on the shifting sleeve 58 are just to neutral position so that further outward movement of the rod 93 completely removes the ball 91 from the opening 86 and the tension of the spring 101 forces the tubular sleeve 82 forwardly with a snap thereby positively causing the gears to slip past their neutral position and into engagement with the opposite gear. When the tubular sleeve 82 has moved forwardly a sufficient distance the ball 91 will be forced into the opening 85 by the action of the spring 92 and the gearing will be locked in the overdrive.

In Figs. 6 and 7 I have illustrated a still further modification embodying the invention but in this arrangement it should be noted that the gears for both the underdrive and the overdrive are constantly in mesh and the selection of the proper gear ratio is obtained by the engagement of a clutch member with one or the other of the driven gears as will hereafter be described. This mechanism may, the same as the others, heretofore described, be included as a separate unit in connection with the transmission gearing of the motor vehicle or it may be built directly into the transmission mechanism. The gearing is adapted for use with either type of motor vehicle, that is, of the shifting gear type or the planetary gear type, it being preferable to employ the shifting arrangement shown in Fig. 3 when this modification is used in connection with the planetary gear type of motor vehicles.

The housing for the gearing mechanism is indicated by 105 and suitably connected by means of bolts 106 to the usual axle or differential housing 107. The driven shaft 108 extends horizontally within the housing 107, the end shown in Fig. 6 being provided with a gear 109 which is secured against rotation with respect to the shaft 108 by a key 110. This gear 109 is provided with internal gear teeth 111 and external gear teeth 112 which when properly engaged propel the motor vehicle in either the overdrive or the underdrive. The drive shaft is indicated by 113 and extends horizontally within the housing 105, the axis of the drive shaft 113 being positioned off center with respect to the axis of the driven shaft 108 the ends of the two shafts terminating adjacent each other. At the rearward end of the drive shaft 113 is a bushing 114 in which the drive shaft rotates and upon this bushing is mounted a freely rotatable sleeve 115, provided at its rearward end with external gear teeth 116 positioned so as to be constantly in mesh with the internal gear teeth 111 of the gear 109. The forward portion of the sleeve 115 is also provided with a plurality of radially extending clutch teeth 117 with which is adapted to engage a clutch member to be later described. The sleeve 115 carries a bushing 118 upon which is rotatably mounted a gear 119, the rearward end of which is provided with internal gear teeth 120 positioned so as to be constantly in mesh with the external gear teeth 112 of the gear 109. This gear 119 is rotatably supported in the housing 105 by a plurality of ball bearings 121 to insure free rotation of the gear 119. The forward end of the gear 119 is provided with a plurality of longitudinally extending teeth 122 adapted to be engaged by a suitable clutch member and when so engaged the motor vehicle is propelled in its overdrive.

The clutch mechanism herein shown is one of the many types which can be employed but for purpose of illustration has been selected as the most simple form. The drive shaft 113 is provided with a plurality of outwardly extending splines 123 extending longitudinally of the drive shaft and forward of the sleeve 115. These splines co-operate with depending splines 124 provided upon a clutch member 125 and while the co-operation of these splines prevent relative rotation between the drive shaft 113 and the clutch member 125, the latter is nevertheless permitted to be freely moved longitudinally along the shaft. The rearward end of the clutch member 125 is provided with a plurality of internal teeth 126 and positioned so that upon the forward movement of the clutch member 125 the teeth 126 thereupon will engage the teeth 117 upon the gear 115 and the vehicle will be propelled in its underdrive. Upon rearward movement of the clutch member the teeth 126 will engage the teeth 122 upon the gear 119 and thereby cause the motor vehicle to be propelled in its overdrive.

This clutch member 125 is provided with a circumferential groove 127 with which engages a bifurcated end of a shifting fork 128, the upper end being rigidly secured by a pin 129 to a rod 130 suitably connected to the shifting means which is not herein shown.

In each of the arrangements herein described, the shifting from one drive to the other with ease, is attributable primarily to the feature that all of the gears are rotating simultaneously in the same direction, and that there are no dead parts with which the gears are required to engage in shifting from one gear ratio to another, and the quietness of the overdrive and underdrive is obtained by employing internal gears in mesh with external gears of the desired number of teeth so that a considerable number of these teeth are in mesh during the driving engagement.

While I have illustrated and described the preferred constructions embodying my invention it is to be understood that many modifications and rearrangements may be resorted to without departing from the spirit of the invention as contained in the appended claims.

Having thus described my invention, what I claim is:

1. In gearing for the purpose specified, the combination of a housing, a pair of shafts, the axes of which are offset with respect to each other, an external and internal gear mounted upon one of said shafts, an internal and external gear slidably mounted upon the other of said shafts, and means for shifting said slidable gears into a position in which the internal slidable gear is in mesh with the external gear on the other shaft, or in which the external slidable gear is in mesh with the internal gear on the other shaft.

2. In gearing for the purpose specified, the combination of a housing, a rotatable shaft mounted therein, an internal gear and an external gear non-rotatably mounted on said shaft, a second rotatable shaft positioned off center with respect to the axis of said first shaft, an external gear and an internal gear slidably but non-rotatably mounted on said second shaft, and means for shifting said slidable gears in one direction in which the internal slidable gear meshes with the external gear on said first shaft, and for shifting said slidable gears in the opposite direction in which the slidable external gear meshes with the internal gear on said first shaft.

3. In gearing for the purpose specified, the combination of a housing, a rotatable shaft mounted therein, an internal gear and an external gear concentric with said shaft and rigidly secured thereto, a second rotatable shaft mounted in said housing, the axes of said shafts being disaligned with respect to each other, a slidable member non-rotatably mounted on said second shaft, the slidable member having internal and external gear teeth concentric with the axis of said second shaft, and means for shifting said slidable member in one direction in which the internal gear teeth thereof mesh with the external gear on said first shaft and in an opposite direction in which the external gear teeth of said slidable member mesh with the internal gear on said first shaft.

4. In gearing of the type specified, the combination of a housing, a rotatable driven shaft mounted therein, an internal gear secured to said shaft, an external gear secured to said shaft, a drive shaft rotatably mounted in said housing, a slidable member non-rotatably carried by said drive shaft, one end of said slidable member having aligned external and internal gear teeth, said teeth being in neutral position when disposed between said external gear and said internal gear on said driven shaft, and means for actuating said slidable member in one direction in which the internal gear teeth thereof mesh with the external gear of said driven shaft and in the opposite direction in which the external gear teeth of said member mesh with the internal gear of said driven shaft.

5. In gearing for the purpose specified, the combination of a housing, a driven shaft rotatably mounted therein, an internal gear and an external gear secured to said shaft, a drive shaft rotatably mounted in said housing, said drive shaft having a different axis of rotation than said driven shaft, a longitudinally slidable member carried by said drive shaft, cooperating splines between said drive shaft and said slidable member to thereby prevent independent rotation therebetween, external gear teeth and internal gear teeth provided upon one end of said slidable member, and means for shifting said member so that the internal gear teeth thereon mesh with the external gear teeth on said driven shaft or to shift the said member so that the external gear teeth thereon mesh with the internal gear on said driven shaft, the ratios of said meshing gears being different so that the driven shaft may be rotated at different speed ratios with respect to the drive shaft depending upon the position of said slidable member.

6. In gearing for the purpose specified, the combination of a housing, a drive shaft rotatably mounted in said housing, a driven shaft rotatably mounted in said housing the axis of which is positioned off center with respect to the axis of said drive shaft, an internal gear and an external gear mounted for rotation with said driven shaft, an external gear and an internal gear mounted on said drive shaft, the external gear on said driven shaft adapted to mesh with said internal gear on said drive shaft and the internal gear on said driven shaft adapted to mesh with said external gear on said drive shaft, the ratios of said meshing gears being different, and means for selectively connecting said driven shaft with said drive shaft through either pair of meshed gears.

In testimony whereof, I hereunto affix my signature.

JAMES P. JOHNSON.